United States Patent [19]
Strobl et al.

[11] Patent Number: 5,563,462
[45] Date of Patent: Oct. 8, 1996

[54] TWO-PART END CAP ASSEMBLY

[75] Inventors: Georg Strobl, Stuttgart, Germany; To F. Wong, Hong Kong, Hong Kong

[73] Assignee: Johnson Electric S.A., Switzerland

[21] Appl. No.: 284,152

[22] Filed: Aug. 2, 1994

[30] Foreign Application Priority Data

Aug. 11, 1993 [GB] United Kingdom .............. 9316643

[51] Int. Cl.⁶ .................... H02K 5/24; H02K 11/00
[52] U.S. Cl. ............................. 310/71; 310/51
[58] Field of Search .................... 310/51, 68 R, 310/68 C, 71, 89, 40 MM, 221

[56] References Cited

U.S. PATENT DOCUMENTS

| | | | |
|---|---|---|---|
| 4,845,393 | 7/1989 | Burgess et al. | 310/51 |
| 5,196,750 | 3/1993 | Strobl | 310/239 |
| 5,231,322 | 7/1993 | Richards et al. | 310/51 |
| 5,281,876 | 1/1994 | Sato | 310/40 MM |

FOREIGN PATENT DOCUMENTS

| | | |
|---|---|---|
| 509683 | 10/1982 | European Pat. Off. . |
| 8910161 | 2/1990 | Germany . |
| 2222316 | 2/1990 | United Kingdom . |
| 2248348 | 4/1992 | United Kingdom . |
| 8801802 | 3/1988 | WIPO . |

*Primary Examiner*—Steven L. Stephan
*Assistant Examiner*—Michael Wallace, Jr.
*Attorney, Agent, or Firm*—Ostrolenk, Faber, Gerb & Soffen, LLP

[57] ABSTRACT

Choke coils (5) are attached to the inner part (1) of a two-part end cap assembly by means of first and second leads (9 and 30). Contact means (10) attached to the outer part (6) of the assembly are provided with two slotted plugs which each have two legs. On insertion of each slotted plug in a respective slot formed in the external surface of the inner part (1) of the assembly, the two legs of the slotted plug engage opposite sides of a first lead (9) of one choke coil (5) extending transversely across the slot and bite the opposite sides so as to make good electrical and mechanical contact with the first lead. Both legs of each slotted plug are formed with retaining teeth for engagement with the end walls of the slot into which the slotted plug is inserted, to resist withdrawal of the slotted plug from the slot. This helps secure the inner and outer parts in axial engagement.

6 Claims, 4 Drawing Sheets

TWO-PART END CAP ASSEMBLY

FIELD OF THE INVENTION

The invention relates to an end cap assembly for a fractional horsepower PMDC electric motor and, in particular, to such an assembly fitted with at least one suppression element.

BACKGROUND ART

It is common to provide electric motors with suppression elements to prevent or reduce electrical interference which, in automotive environments, may impair the functioning of on-board microprocessors. Typically, these elements take the form of a choke connected in series between a power supply terminal and a motor brush or a capacitor connected between a motor brush and earth or between two motor brushes. Diodes may also be used in more sophisticated suppression circuits. These suppression elements are conveniently mounted on the motor end cap. However, for smaller size electric motors, it is often difficult to accomodate these suppression elements in the end cap. One way to overcome this difficulty is to provide a two-part end cap and to accommodate the suppression elements between the two parts of the end cap.

Thus, as disclosed in UK Patent Specification No. 2 222 316, it is known to provide an end cap assembly, for a fractional horsepower PMDC electric motor, comprising an inner part having internal and external surfaces; brush gear mounted on the internal surface of the inner part; a suppression element mounted on the external surface of the inner part in electrical contact with the brush gear; an outer part shaped for axial engagement with the inner part and formed with at least one terminal aperture; and a terminal extending through the aperture.

In this case, the terminal is mounted in the inner part and the outer part serves as a protective cover for the suppression element. Separate means must therefore be provided for supporting the suppression element on the external surface of the inner part, for making a permanent connection between the suppression element and the brush gear and for making a permanent connection between the terminal and the suppression element.

This results in a complicated structure which, as a consequence, is relatively difficult and costly to produce.

The purpose of the present invention is to overcome or at least reduce these disadvantages and to provide a two-part end cap assembly of simpler construction which is easier and less costly to produce.

BRIEF DESCRIPTION OF THE INVENTION

This is achieved by providing an assembly in which the suppression element has at least one lead mounted on the external surface of the inner part; and contact means are attached to the terminal and engaged with the lead of the suppression element as a result of axial engagement of the inner and outer parts.

Thus, according to the invention, there is provided an end cap assembly, for a fractional horsepower PMDC electric motor, comprising an inner part having internal and external surfaces; brush gear mounted on the internal surface of the inner part; a suppression element mounted on the external surface of the inner part in electrical contact with the brush gear and having at least one lead mounted on the external surface of the inner part; an outer part shaped for axial engagement with the inner part and formed with at least one terminal aperture; a terminal extending through the aperture; and contact means attached to the terminal and engaged with the lead of the suppression element as a result of axial engagement of the inner and outer parts.

In a preferred embodiment of the invention, a slot is formed in the external surface of the inner part; the lead of the suppression element extends transversely across the slot; the contact means are provided with a slotted plug, for insertion into the slot, having two legs which are respectively engageable with and bite opposite sides of the lead after insertion of the slotted plug into the slot, upon axial engagement between the inner and outer parts.

Thus, where the suppression element is attached to the inner part of the end cap assembly by means, for example, of the lead of the suppression element, engagement between the slotted plug and the lead tends to secure the contact means to the inner part. This tendency is enhanced by forming retaining teeth on the legs of the slotted plug for engagement with end walls of the slot formed in the inner part for receiving the slotted plug. The terminal may therefore, advantageously, be attached to the outer part of the end cap assembly so that insertion of the slotted plug into the slot secures, or helps secure, the inner and outer parts together.

Where necessary, a further suppression element may be mounted on the outer part. In this case, an auxiliary slot is preferably formed in the internal surface of the outer part and a further lead from the further suppression element extends transversely across the auxiliary slot; the contact means are provided with an auxiliary slotted plug, for insertion into the auxiliary slot, having two legs which are respectively engageable with and bite opposite sides of the further lead after insertion of the auxiliary slotted plug into the auxiliary slot. This simplifies connection of the further suppression element to the contact means in that this connection can be effected when positioning the contact means on the outer part of the end cap assembly.

Retaining teeth may also be formed on the legs of the auxiliary slotted plug for engagement with the end walls of the auxiliary slot. This helps attach the terminal, by way of the contact means, to the outer part of the end cap assembly.

An embodiment of the invention is hereinafter described, by way of example only, with reference to the accompanying drawings.

DETAILED DESCRIPTION OF THE PREFERRED EMBODIMENT

Figure 1:
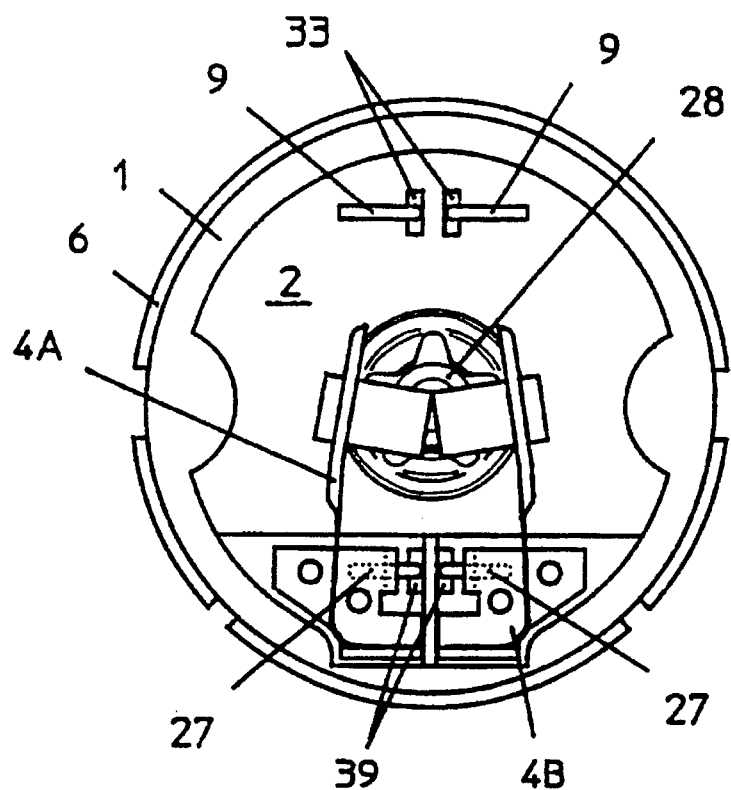
FIGS. 1 and 2 are an internal end view and a cross-sectional side view of an end cap assembly according to the present invention.
Figure 2:
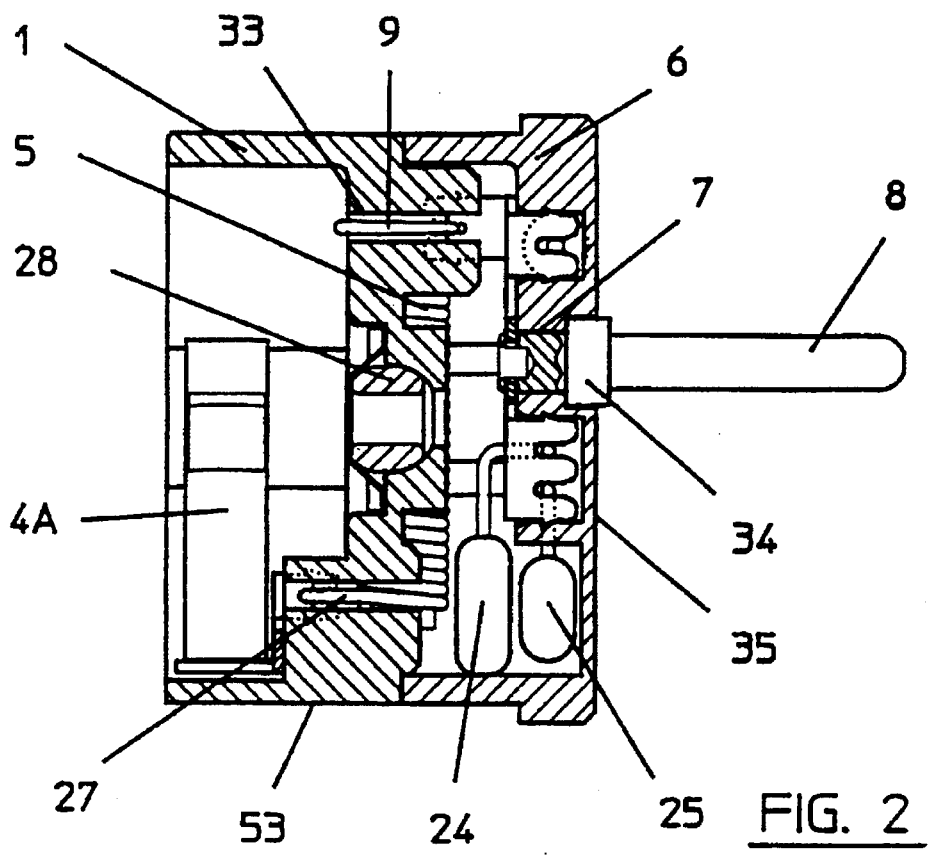

As shown in FIGS. 1 and 2, an end cap assembly according to the invention has an axially inner part 1 and an axially outer part 6, in axial engagement for insertion in the open end of a metal electric motor housing canister.

Two choke coils 5 (FIG. 3), a diode 18, and first, second and third capacitors 24, 25 and 26, forming parts of a suppression circuit, are enclosed between the inner and outer parts 1 and 6. The first and second leads 9 and 27 of each choke coil 5 hold the choke coils 5 on the external surface 3 of the inner part 1. Leads 9 are connected to contact means 10 comprising two contacts 10A and 10B, which are "mirror image" inversions of each other and carried by terminals 8 fitted to the outer part 6. Leads 27 are connected to brush gear 4 comprising two sub-assemblies 4A and 4B mounted on the inner surface 2 of the inner part 1.

Figure 7:
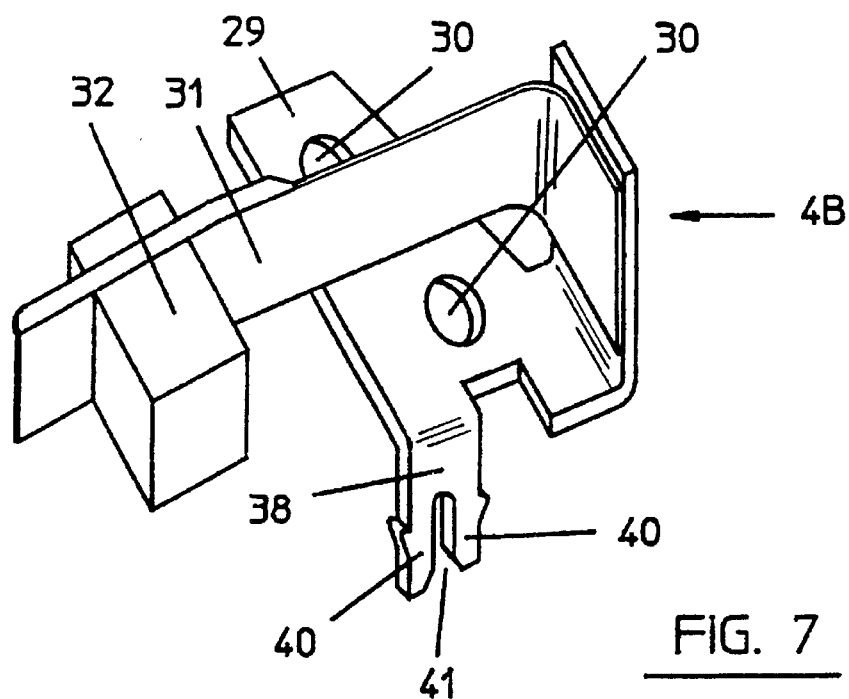
FIG. 7 is a perspective view of a brush gear sub-assembly forming part of the end cap assembly shown in FIGS. 1 to 6.
Figure 8:
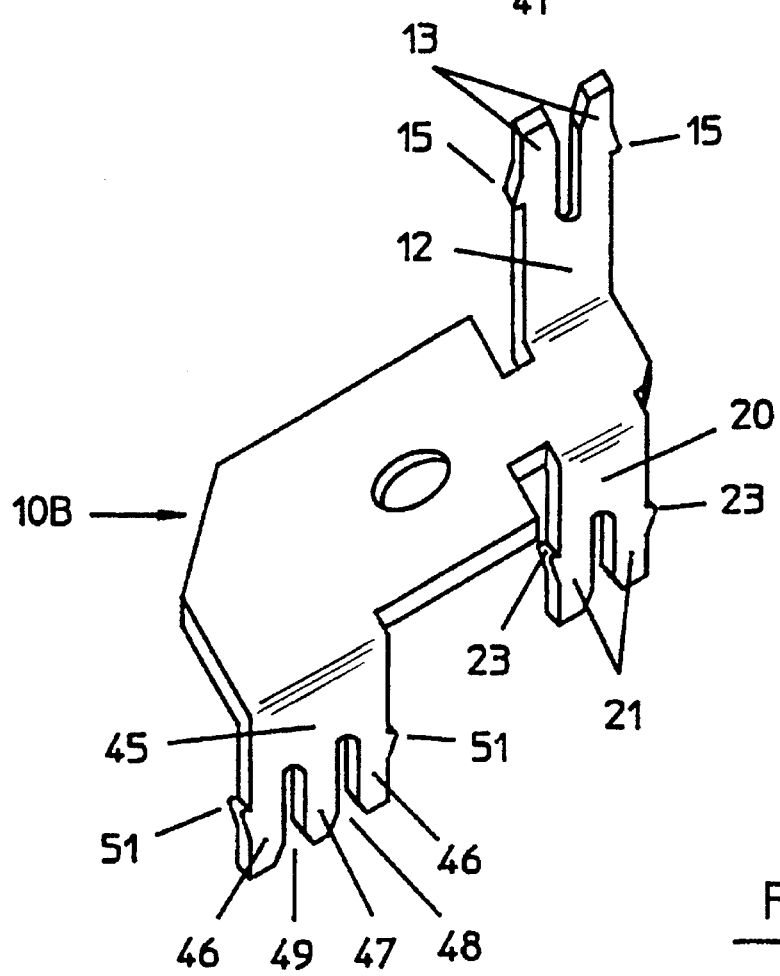
FIG. 8 is a perspective view of contact means forming part of the end cap assembly shown in FIGS. 1 to 6.

The inner part 1 is provided with a self-aligning bearing 28 and with two brush gear sub-assemblies 4A and 4B, which are mirror image of each other. As shown in FIG. 7, each brush gear sub-assembly 4A, 4B comprises a mounting plate 29 provided with two apertures 30 for attachment of the sub-assembly 4A or 4B to the internal surface 2 of the inner part 1. A resilient brush arm 31 is attached to the mounting plate 29 and carries a brush 32 for engagement with the commutator of the motor.

Figure 3:
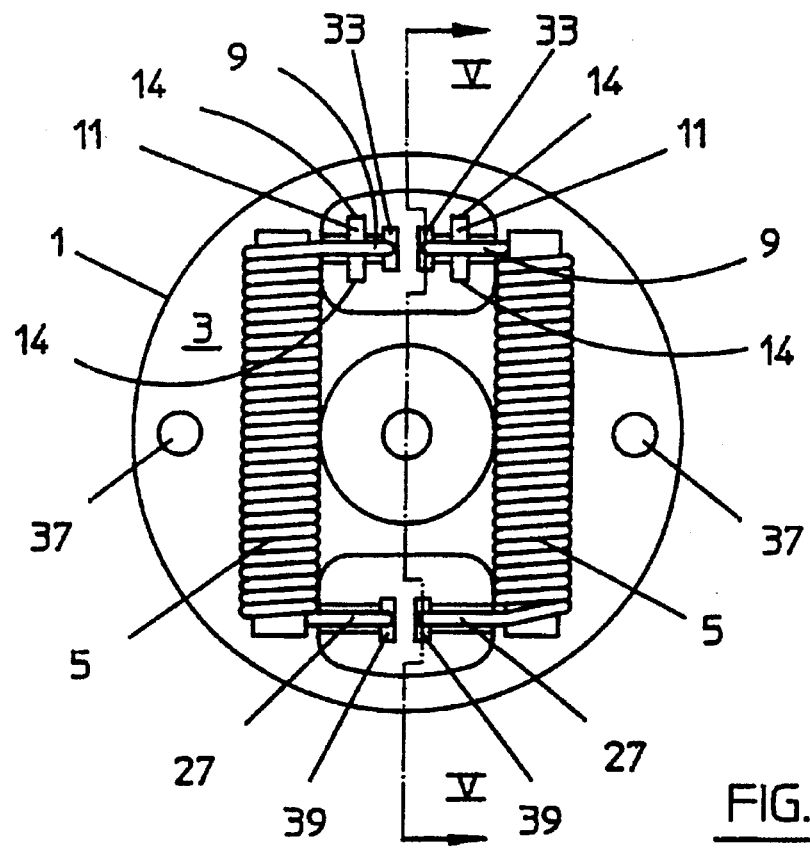
FIG. 3 is an end view of an external surface of an inner part of the end cap assembly shown in FIGS. 1 and 2.

As shown in FIG. 3, two slots 11 are formed in the external surface 3 of the inner part 1 and the first leads 9 of the two choke coils 5 are respectively laid transversely across these slots 11, passed through apertures 33 in the inner part 1, and bent against the internal surface 2 of the inner part 1, as shown in FIGS. 1 and 2, to help secure the choke coils 5 in position on the external surface 3 of the inner part 1.

Figure 4:
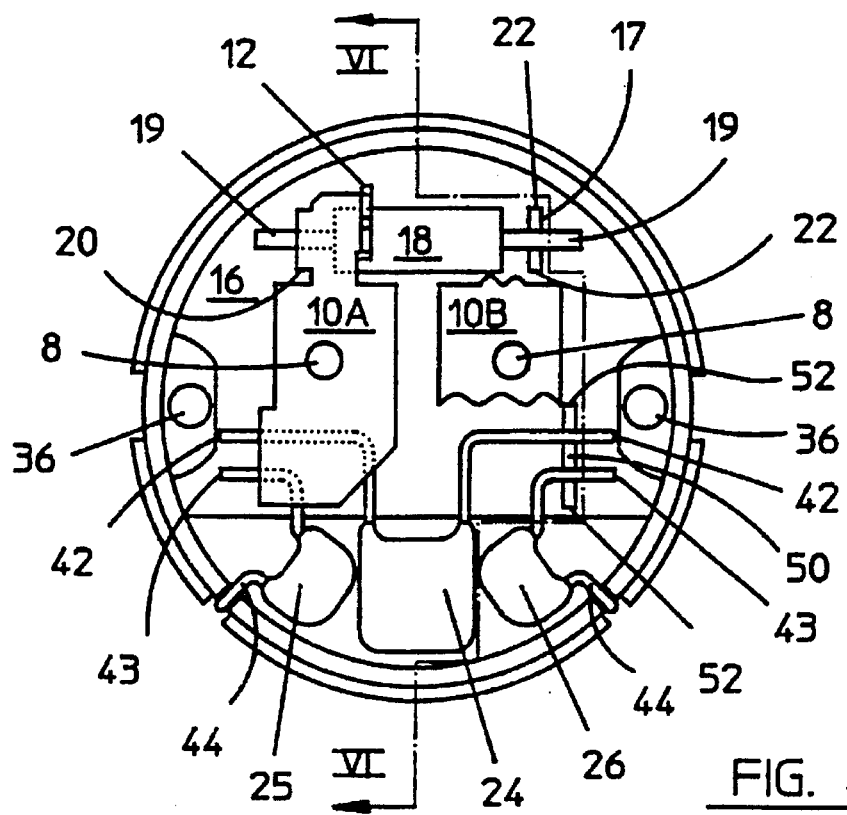
FIG. 4 is an end view of an internal surface of an outer part of the end cap assembly shown in FIGS. 1 and 2, with part broken away for the sake of clarity.
Figure 6:
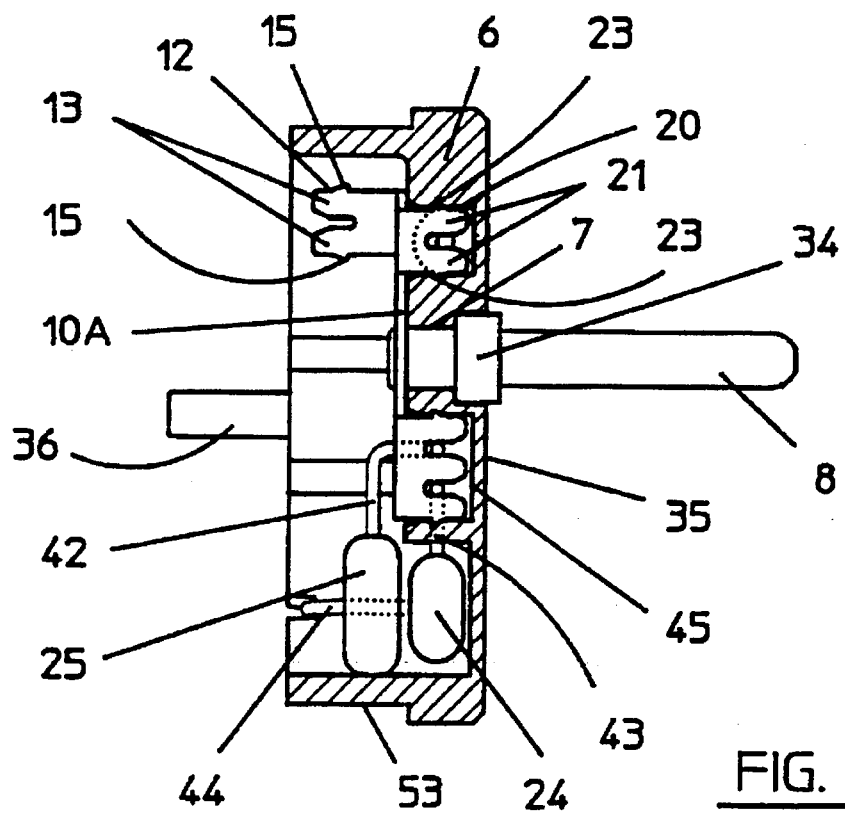

As shown in FIGS. 2, 4 and 6, terminals 8, which extend through apertures 7 in the outer part 6, are provided with annular formations 34 which abut the external surface 35 of the outer part 6 and, at their inner ends, are riveted to the contacts 10A and 10B which are thereby mounted on the internal surface 16 of the outer part 6. Each contact 10A, 10B is provided with a slotted plug 12 for insertion into one of the slots 11 formed in the external surface 3 of the inner part 1 and has two legs 13 which are respectively engageable with opposite sides of one of the leads 9 and bite into the opposite sides of the lead 9 after insertion of the slotted plug 12 into the slot 11. The slotted plugs 12 are aligned with the slots 11 with the aid of prongs 36 on the outer part 6 which are received in apertures 37 in the inner part 1.

As shown in FIG. 6, each slotted plug 12 has retaining teeth 15 formed on its legs 13 for engagement with end walls 14 of the slot 11, into which it is inserted, to resist withdrawal of the slotted plug 12 from the slot 11. This helps secure the inner and outer parts 1 and 6 in axial engagement.

Figure 5:
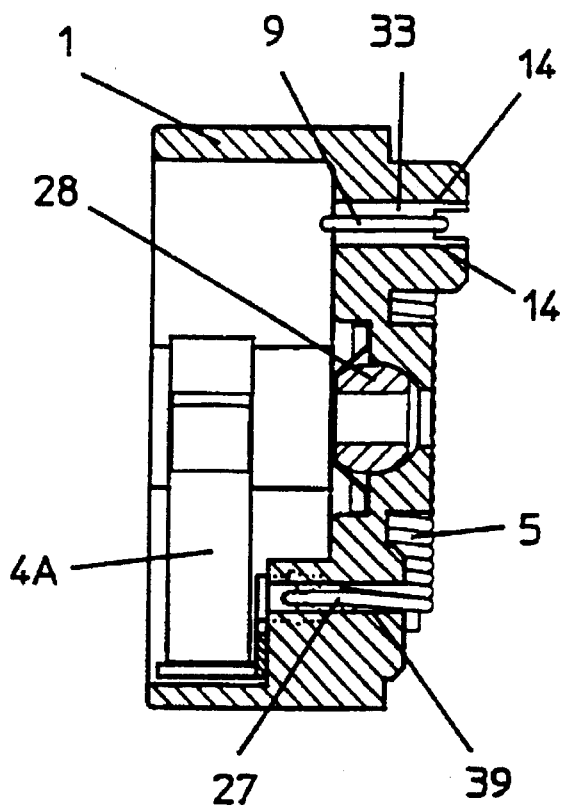
FIGS. 5 and 6 are sectional side views of the inner and outer parts of the end cap assembly respectively taken across the Sections V—V and VI—VI shown in FIGS. 3 and 4.

As shown in FIG. 7, the mounting plates 29 of the two brush gear sub-assemblies 4A and 4B are also provided with slotted plugs 38 for respective connection to the second leads 27 of the two choke coils 5 which pass through apertures 39 in the inner part 1, as shown in FIGS. 1, 3 and 5. Each slotted plug 38 has two legs 40 defining a slot 41 for receiving the second lead 27 of the choke coil 5 connected to the brush gear sub-assembly 4A or 4B and the two legs 40 are provided with retaining teeth, similar to the retaining teeth 15 formed on the legs 13 of the slotted plug 12 shown in FIG. 6. Although not shown, the internal surface 2 of the inner part 1 is formed with slots for receiving the slotted plugs 38. The second leads 27 are respectively laid transversely across these slots and, as the sub-assemblies 4A and 4B are mounted on the inner part 1, by pressing the slotted plugs 38 into the slots in the inner part 1, the legs 40 of each slotted plug 38 bite into opposite sides of the lead 27, so as to make good electrical and mechanical engagement between the lead 27 and the brush gear sub-assembly 4A or 4B. This helps secure the choke coils 5 in position on the external surface 3 of the inner part 1 and ensures that brush gear sub-assemblies 4A and 4B are connected, respectively, to the terminals 8.

The diode 18, which has two leads 19, the first capacitor 24, which has two leads 42, and the second and third capacitors 25 and 26, which each have two leads 43 and 44, are all mounted on the internal surface 16 of the outer part 6 for connection to the contacts 10A and 10B. The contacts 10A and 10B are therefore provided with two first auxiliary slotted plugs 20 for respective connection to the diode leads 19 and with two second auxiliary slotted plugs 45 for respective connection to leads 42 from the first capacitor and for respective connection to leads 43 from the second and third capacitors 25 and 26.

For this purpose, the diode leads 19 extend transversely across two first auxiliary slots 17 formed in the internal surface 16 of the outer pan 6 for receiving the two first auxiliary slotted plugs 20 on the contacts 10A and 10B. As with the slotted plugs 12, each of the first auxiliary slotted plugs 20 has two legs 21 which are respectively engageable with opposite sides of the diode lead 19 and bite the opposite sides of the lead 19 after insertion of the first auxiliary slotted plug 20 into the first auxiliary slot 17. Similarly, each first auxiliary slotted plug 20 has retaining teeth 23 formed on its legs 21 for engagement with end walls 22 of the first auxiliary slot 17 in which it is inserted, to resist withdrawal of the first auxiliary slotted plug 20 from the first auxiliary slot 17.

The second auxiliary slotted plugs 45 are each provided with two outer legs 46 and an inner leg 47 defining two slots 48 and 49 respectively for receiving a lead 42 from the first capacitor 24 and a lead 43 from one of the second and third capacitors 25 and 26. Two pairs of leads 42 and 43 are respectively laid transversely across two second auxiliary slots 49 formed in the interior surface 16 of the outer pan 6 for receiving the second auxiliary slotted plugs 45. The legs 46 and 47 on opposite sides of each slot 48 engage opposite sides of the lead 42 accommodated in the slot 48 and bite these opposite sides after insertion of the second auxiliary slotted plugs 45 into the second auxiliary slots 50. Similarly, the legs 46 and 47 on opposite sides of each slot 49 engage opposite sides of the lead 43 accommodated in the slot 49 and bite into these opposite sides after insertion of the second auxiliary slotted plugs 45 into the second auxiliary slots 50. With a construction similar to that of the slotted plugs 12 engaging the first leads 9 of the choke coils 5 and the first auxiliary slotted plugs 20 engaging the leads 19 of the diode 18, each second auxiliary slotted plug 45 has retaining teeth 51 formed on its outer legs 46 for engagement with the end walls 52 of the second auxiliary slots 50 to resist withdrawal of the second auxiliary slotted plugs 45 from the second auxiliary slots 50. The first capacitor 24 is therefore connected between the two brush gear sub-assemblies 4A and 4B (or between the two terminals 8). However, the remaining leads 44, from the second and third capacitors 25 and 26, are led between the inner and outer parts 1 and 6 (which may be notched, to accommodated these leads 44) and laid along-side the cylindrical outer surface 53 of the end cap assembly, for electrical contact with the metal electric motor housing canister into which the end cap assembly is inserted. The second and third capacitors 25 and 26 are thereby respectively connected to the two brush gear sub-assemblies 4A, 4B (or the two terminals 8), on one side, and respectively earthed, on the other side.

We claim:

1. An end cap assembly, for a fractional horsepower PMDC motor, comprising:

an inner pan having internal and external surfaces;

brush gear mounted on the internal surface of the inner part;

a suppression element mounted on the external surface of the inner part in electrical contact with the brush gear;

an outer part shaped for axial engagement with the inner part and formed with at least one terminal aperture; and a terminal extending through said aperture;

wherein:

the suppression element has at least one lead mounted on the external surface of the inner part; and a contact is attached to the terminal and engaged with the lead of the suppression element as a result of axial engagement of the inner and outer parts.

2. The assembly, according to claim 1 wherein:

a slot is formed in the external surface of the inner part;

the lead of the suppression element extends transversely across the slot;

the contact has a slotted plug, for insertion into the slot, having two legs which are respectively engaged with and bite opposite sides of the lead after insertion of the slotted plug into the slot.

3. The assembly, according to claim 2 wherein:

the slot has end walls; and the slotted plug has retaining teeth formed on its legs for engagement with the end walls to resist withdrawal of the slotted plug from the slot.

4. The assembly, according to claim 2 wherein the terminal is firmly attached to the outer part.

5. The assembly, according to claim 1 wherein:

the outer part has an internal surface which together with the external surface of the inner part, encloses the suppression element;

an auxiliary slot is formed in the internal surface of the outer part;

a further suppression element is mounted on the internal surface of the outer part and has a further lead which extends transversely across the auxiliary slot; and the contact is provided with an auxiliary slotted plug, inserted into the auxiliary slot, having two legs which are respectively engaged with and bite opposite sides of the further lead after insertion of the auxiliary slotted plug into the auxiliary slot.

6. The assembly, according to claim 5 wherein:

the auxiliary slot has end walls; and the auxiliary slotted plug has retaining teeth formed on its legs for engagement with the end walls of the auxiliary slot to resist withdrawal of the auxiliary slotted plug from the auxiliary slot.

* * * * *